TEMPERATURE RESPONSIVE RESISTANCE DEVICE

Filed May 28, 1962

INVENTOR.
Stanford R. Ovshinsky
BY Wallenstein, Spangenberg + Hattis
Attys.

United States Patent Office 3,201,736
Patented Aug. 17, 1965

3,201,736
TEMPERATURE RESPONSIVE RESISTANCE DEVICE

Stanford R. Ovshinsky, Detroit, Mich., assignor, by mesne assignments, to Energy Conversion Devices, Troy, Mich., a corporation of Delaware Filed May 28, 1962, Ser. No. 198,281
18 Claims. (Cl. 338—25)

This application is a continuation-in-part of my application Serial No. 118,642, filed June 21, 1961.

This invention relates to solid state temperature responsive resistance devices for controlling the current flow in an electrical circuit in accordance with the temperature conditions affecting the devices.

Temperature responsive resistance devices, such as mixed oxide thermistors and the like, have been proposed and used in the past, but they have all had inherent shortcomings which have seriously restricted their commercial use. Generally, they are relatively low temperature devices, not being able to withstand high temperatures such as 300° C. or higher. They are not stable and repeatable in operation over extended periods of time. They have relatively high resistance characteristics and are not usable where substantial current flows are desirable. They are usually limited to D.C. circuit applications. The temperature-resistance coefficients thereof are relatively small requiring relatively large changes in temperature for relatively small changes in resistivity. They are relatively slow in response and are not usable in printed circuit forms.

The principal object of this invention is to provide an improved solid state temperature responsive resistance device for controlling current flow in an electrical circuit in accordance with temperature conditions affecting the device, wherein the aforementioned inherent shortcomings of the prior art devices are eliminated, wherein the solid state device may withstand relatively high temperatures, up to 1,000° C. or higher depending upon the composition of the device, wherein the solid state device is stable and repeatable in operation in its operating range over extended periods of time, wherein the solid state device has relatively low resistance characteristics and is capable of controlling substantial current flows in the electrical circuit, wherein the solid state device is particularly useful for A.C. circuits and may in certain circumstances be used for D.C. circuits, wherein the solid state device has a substantial negative temperature-resistance coefficient and high sensitivity due to substantial changes in resistivity thereof upon changes in temperature thereof, wherein the solid state device has rapid response to changes in temperature especially where it is of the printed circuit type, wherein the solid state device may be so constructed as to be operable at various desired temperature ranges, wherein the solid state device is simple in construction, foolproof in operation and inexpensive to manufacture, and wherein the solid state device is admirably suited for temperature control systems, control systems generally which respond to temperature conditions, and the like.

Briefly, the temperature responsive resistance device of this invention includes spaced apart metallic electrodes and a lithium compound interposed between and in electrical contact with the electrodes. The lithium compound has a substantial negative temperature-resistance coefficient and provides large changes in resistivity upon changes in the temperature thereof. Connecting means, connected to the electrodes, operate to connect the lithium compound in series with the electrical circuit for controlling the current flow therethrough in accordance with the temperature of the lithium compound as affected by the temperature conditions to increase the current flow upon an increase in temperature and to decrease the current flow upon a decrease in temperature.

I have discovered that various normally solid lithium compounds may exceptionally effectively be employed as the thermally sensitive resistance material, they having a resistance change factor in the neighborhood of 1,000 as compared to a resistance change factor in the neighborhood of 10 for the presently used thermally sensitive resistance materials. Among such lithium compounds are lithium carbonate, lithium hydroxide, lithium orthosilicate, lithium sulfate, lithium acetate, lithium metasilicate, lithium metaborates, lithium fluoride, lithium nitride, lithium nitrate, lithium oxide, lithium orthophosphate, lithium zirconium silicate, and mixtures of any two or more thereof. I find it most desirable to utilize the lower melting lithium compounds for the lower operating temperature ranges and the higher melting point lithium compounds for the lighter operating temperature ranges and, where the lithium compounds are to be exposed to atmospheric conditions, to utilize lithium compounds which are essentially non-hygroscopic, and which are generally water-insoluble or only slightly water-soluble, preferably having a solubility below 15 parts per 100 parts of cold water and, better still, a solubility below 8 parts per 100 parts per cold water. I have found that, for the purpose of my present invention, the compositions obtained by essentially fully or completely burning metallic lithium in air or oxygen are especially satisfactory. Such latter compositions appear to comprise mixtures of lithium carbonate, lithium hydroxide, and lithium oxide generally in approximately equal proportions. Also especially useful is lithium hydroxide. In those instances in which hygroscopicity and appreciable water-solubility of the lithium compounds present difficulties due to the particular ambient atmospheric conditions of the environment in which said lithium compounds are to be used, as for example in the case of lithium acetate, they may be encapsulated in an air free environment or, if desired, in an atmosphere of an inert gas such as helium, argon, nitrogen or the like.

The solid state temperature responsive resistance devices of this invention are operative, repeatable and stable up to at least the melting points of the lithium compounds or mixtures used therein and they operate to uniformly modulate the current flow in accordance with the temperature conditions affecting the same. Accordingly, it is desirable to select the lithium compounds or mixtures thereof in accordance with the temperature conditions with which they are to be used, so that they will remain solid and not melt in the normal operating temperature range and uniformly modulate the current flow in accordance with the temperature conditions.

The temperature responsive resistance devices of this invention are also operative and stable at higher temperature conditions where the lithium compounds or mixtures thereof are in a molten state and, under these conditions, they also operate to uniformly modulate the current flow in accordance with these higher temperature conditons. Here, also, it is desirable to appropriately select the lithium compounds or mixtures thereof in accordance with such higher temperature conditions. Where, under operating conditions, the lithium compounds are in a molten state, they may be suitably maintained in place, as by encapsulating the same, or, preferably, as by utilizing suitable solid binders or diluents of higher melting points, such as lithium ceramic frit materials, other lithium compounds, electrical insulators, semi-conductors or the like, for maintaining the device as whole in a solid state. In this respect, the solid state device comprises a solid mixture of the higher melting point binder or diluent and the lower melting point lithium compound.

When the solid state device is heated to a temperature sufficient to melt the lithium compound, the molten lithium compound forms small pools or rivulets in the solid binder or diluent so that the mixture as a whole of the device remains as a solid mass with the small lithium compound pools or rivulets contained therein for conducting the current flow therethrough, there being no physical change in the solid state mixture which is apparent to the eye. Because of the self sustaining characteristics of the solid state mixture, it may be readily used in a number of different manners for current controlling purposes, even though the lithium compound may be molten, as for example, layers or films arranged between sheet type electrodes, bodies arranged between concentric electrodes, and coating or films on printed circuits. The solid binders or diluents, of course, should not so react with the lithium compound as adversely to affect the required electrical resistivity or conductivity characteristics nor to produce reaction products having undesirable properties.

While the changes in resistivity in the solid state and in the molten state of the lithium compounds are uniform with changes in temperature thereof, there is a sharp change in resistivity at the melting points of the lithium compounds, the resistivity in the solid state being many times that in the molten state. Thus, for temperature conditions affecting the temperature responsive device of this invention, which are in the neighborhood of the melting point of the lithium compounds being utilized, substantially "on" and "off" control of the electrical circuit may be realized as the lithium compounds heat and cool through their melting points. The lithium compounds, as they melt and solidify, may be held in situ in the solid state device in the manner described above. Suitable lithium compounds may be selected as to their melting points to provide solid diluents or binders for the meltable lithium compounds and, also, suitable eutectic mixtures of lithium compounds may be prepared to provide selected melting points for the selected lithium flux compound in the eutectic mixture. By way of example, mixtures of lithium hydroxide as the flux compound and lithium carbonate as the eutectic former may be utilized to provide melting points for the lithium hydroxide below the normal melting point thereof of substantially 450° C.

Further objects of this invention reside in the details of construction of the temperature responsive resistance devices of this invention and in the cooperative relationships between the component parts thereof.

Other objects and advantages of this invention will become apparent to those skilled in the art upon reference to the accompanying specification, claims and drawing in which:

Figure 1:
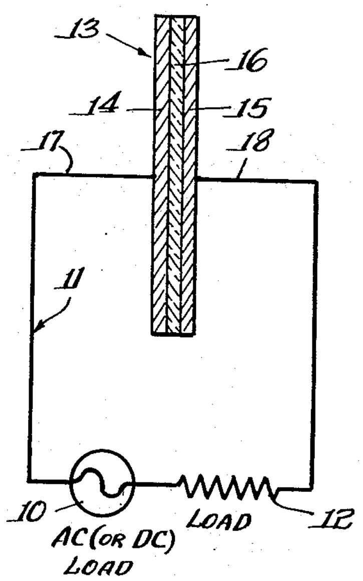
FIG. 1 is a schematic showing one embodiment of the temperature responsive resistance device of this invention.

Referring now to FIG. 1 of the drawing, there is schematically illustrated one embodiment of the temperature responsive resistance device of this invention for controlling current flow in an electrical circuit in accordance with temperature conditions affecting the device. An A.C. or D.C. source 10, connected in the electrical circuit indicated generally at 11 acts to send current through a load 12 which may be a heater coil, a relay coil, a motor winding or the like. The temperature responsive resistance device, generally designated at 13 operates to control the current flow through the electrical circuit 11. The temperature responsive resistance device 13 may, as shown, comprise a pair of electrically conductive metal plates or sheets 14 and 15 forming metallic electrodes, for example, copper magnesium, stainless steel or other metals, and a termally sensitive resistance lithium compound 16 of the character described above extending therebetween and in electrical contact therewith. Electrical leads 17 and 18 connect the electrical circuit 11 to the metallic electrodes 14 and 15.

The lithium compound 16 has a substantial negative temperature-resistance coefficient and operates to increase the current flow in the electrical circuit 11 upon an increase in temperature to which the device 13 is subjected and to decrease the current flow upon a decrease in such temperature. The metallic plates or sheets 14 and 15 are preferably made as thin as possible, consistent with rigidity requirements so that the heat capacity of the device is at a minimum, thereby allowing quick heating and cooling of the device as is desired for high sensitivity and rapid response. A thickness of the order of 0.005 to 0.05 inch gives good results. For rapid operation it is also desirable that the lithium compound resistance material 16 have a relatively small volume and large surface area. This is best obtained by utilizing the lithium compound material in the form of a thin layer or film as shown in FIG. 1, for instance, a film of monomolecular thickness and upwards to thicknesses of about 0.0005 to 0.01 inch. On the other hand, for slower response, the resistance material 16 may be in a more massive form.

The temperature responsive resistance device 13 for controlling the current flow through the electrical circuit 11 may respond to substantially any type of temperature condition for performing substantially any type of control function. For example, the temperature responsive resistance device 13 may be subject to temperature conditions controlled thereby through the electrical circuit 11, it may be used in a fire alarm system and be subjected to the heat coming from the fire for controlling an alarm system, and in the case of a missile or spacecraft or the like heat may be supplied by direct sunlight to the device 13 which may be utilized for orienting the vehicle in appropriate direction or the like.

The layer or film 16 of the lithium compound or mixture is preferably of the kind wherein the lithium compound remains solid over the operating temperature range of the device 13, thereby providing uniform and substantial changes in resistance upon changes in the temperature conditions affecting the device. By selecting appropriate lithium compounds, as for example, lithium fluoride, the device 13 may be uniformly operated at extremely high temperatures without melting of the lithium compound. For still higher temperatures, it may be necessary to utilize the molten state of the lithium compound for uniform temperature control and, here, the layer or film 16 would comprise a solid state mixture including the selected lithium compound and a solid diluent for maintaining the lithium compound in situ, as described above. The layer or film 16 would also comprise a solid state mixture of a solid diluent and a selected lithium compound, where the operating temperature of the device 13 would be near the melting point of the lithium compound, to maintain the melting lithium compound in situ and to obtain circuit "opening" and "closing" operation, also as described above.

Figure 2:
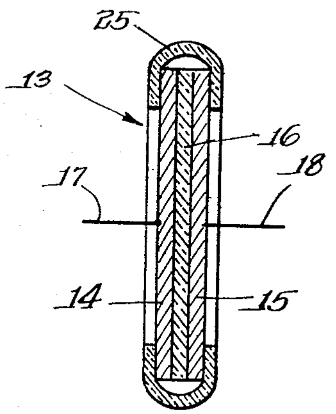
FIG. 2 is a cross-sectional view of a modified type of temperature responsive resistance device which can be used in the system shown in FIG. 1.

In those instances in which hygroscopicity and appreciable water-solubility of the lithium compounds present difficulties due to the particular ambient atmospheric conditions of the environment in which the lithium compounds are to be used, as, for example, in the case of lithium acetate, they may be encapsulated in an air free environment or, if desired, in an atmosphere of an inert gas such as helium, argon, nitrogen or the like. In this respect, FIG. 2 illustrates one manner of encapsupating the lithium compound of the solid state device 13 of FIG. 1, like reference characters being utilized for like parts. Here, a closure 25, formed of gas impervious electrical insulating material, such as glass or the like, is formed over the edges of the device 13 and sealed thereto to protect the lithium compound layer 16 from the ambient atmospheric conditions, and if desired, a suitable atmosphere of inert gas may be confined within the closure 25. In those instances where the lithium compound is not in admixture with a solid diluent and the lithium compound becomes molten in the operating temperature range, the closure 25 may also operate to maintain the molten lithium compound 16 in situ between the sheet electrodes 14 and 15.

In connection with the temperature responsive resistance devices described above it should be noted that if a D.C. voltage is applied which is high enough to electrolyze the lithium compound (and this may not require more than 1.5 volts), one must expect that the compound may thus be decomposed. Thus, the device of the present invention should normally not be used as control devices for D.C. sources, particularly at high voltages, but should normally be limited for use with A.C. sources for which they are admirably suited. Commercial A.C. voltages (e.g. 110 or 220 volts) appear to cause little or no decomposition of the lithium compounds in the above-described device. Where the devices are utilized in D.C. circuits, provision is made for periodically heat treating or reversing the current flow therethrough for depolarizing the same to minimize decomposition thereof.

Figure 3:
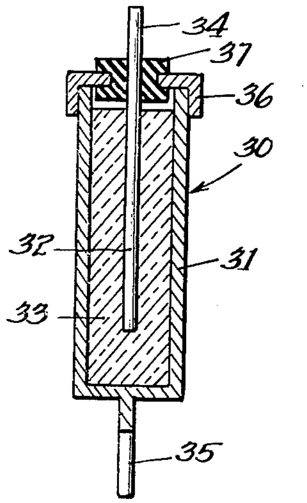
FIG. 3 is a cross-sectional view of another type of temperature responsive resistance device which can be used in the system shown in FIG. 1.

FIG. 3 illustrates another form of the temperature responsive resistance device which is a substantially cylindrical type of device. Here, there are provided an inner metallic electrode 32 which may take the form of a rod or wire and an outer tubular metallic electrode 31 concentrically arranged in spaced apart relation about the inner electrode. Preferably, the outer tubular electrode 31 is cup-shaped in configuration. A lithium compound 33, of the type described avove, having a substantial negative temperature-resistance coefficient is interposed between the inner and outer electrodes 32 and 31 and is in electrical contact therewith. The inner electrode 32 may be extended to form a lead 34 and the outer electrode 31 may be provided with an extension 35 to form a lead for connecting the lithium compound 33 in series in the electrical circuit 11 of FIG. 1. As the temperature of the lithium compound 33 changes, due to the effect of temperature conditions acting thereon, the current flow in the electrical circuit 11 increases upon an increase in temperature and decreases upon a decrease in temperature. If the lithium compound 33 of the device of FIG. 3 is such that it may be adversely affected by air or moisture it may be encapsulated by providing a suitable closure or cover 36 for the open end of the outer electrode 31, and this closure or cover, which is suitably secured and sealed to the outer electrode, is provided with an electrical insulating member 37 for insulating the inner electrode 32 and for sealing the same. If desired, at atmosphere of an inert gas such as helium, argon, nitrogen or the like may be contained in the device in contact with the lithium compound. The device 30 of FIG. 3 operates in the same manner as the devices 13 of FIGS. 1 and 2 and, therefore, a further description of the operation of the device 30 is not necessary.

Figure 4:
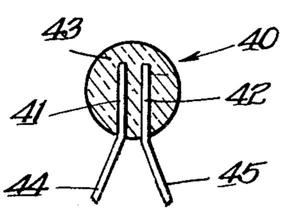
FIG. 4 is a sectional view through still another type of temperature responsive resistance device which can be used in the system shown in FIG. 1.

Still another form of the temperature responsive resistance device is generally designated at 40 in FIG. 4, it being of the small bead type similar to a thermistor. Here, a pair of spaced apart electrodes 41 and 42 in the form of metallic wires or the like are utilized and these electrodes are encompassed by a small bead 43 of lithium compound of the kinds described above. The electrodes 41 and 42 are provided with extensions 44 and 45 for connecting the device 40 into the electrical circuit 11 of FIG. 1. The device 40 of FIG. 4 is subjected to temperature conditions and the resistivity of the lithium compound 43 between the electrodes 41 and 42 changes in accordance with such temperature conditions and operates to increase the current flow in the electrical circuit 11 upon an increase in temperature and to decrease the current flow upon a decrease in temperature. Since the temperature responsive resistance device 40 is of the small bead type it is extremely sensitive to the temperature conditions affecting the same and is extremely fast in its response.

Figure 5:
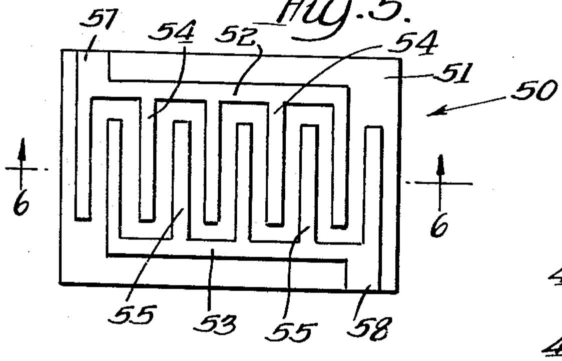
FIG. 5 is a plan view of a further type of temperature responsive resistance device which can be used in the system shown in FIG. 1.
Figure 6:
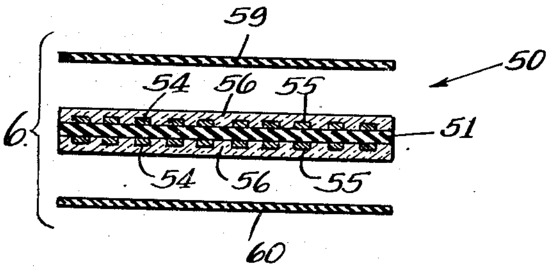
FIG. 6 is an exploded sectional view of the temperature responsive resistance device illustrated in FIG. 5 and taken substantially along the line 6—6 of FIG. 5.

A further form of the temperature responsive resistance device of this invention is generally designated at 50 in FIGS. 5 and 6. It includes an electrical insulating sheet 51 which may be formed of any suitable material, such as mica, ceramic, thermosetting plastic materials or the like, or a suitable metal substrate having an oxide coating acting as an electrical insulator, beryllium oxide which is a good electrical insulator and a good conductor of heat. Upon one side of the insulating sheet 51 is applied a pair of metallic combs 52 and 53 having interleaving teeth 54 and 55, respectively, forming metallic electrodes. The combs 52 and 53 may be applied in any suitable manner to the electrical insulating sheet 51 as by printing, silk screening, vacuum plating or the like. The interleaving comb teeth 54 and 55 may be made quite narrow and closely spaced so as to provide a great interleaving area in a small surface area. The combs 52 and 53 may be provided with tab portions 57 and 58 for connecting the metallic combs into the electrical circuit 11 of FIG. 1.

A coating or film 56 of a lithium compound of the kinds described above is applied to the surface of the insulating sheet 51 over the teeth or electrodes 54 and 55 of the metallic combs and in electrical contact therewith. The coating or film 56 of the lithium compound may be applied to the surface of the insulating sheet 51 in various ways, as for example, by painting or squeegeeing a slurry of the lithium compound thereon and heating and drying the same, by heating the insulating sheet and spraying a slurry of the lithium compound thereon which is baked and dried by the heated sheet, by fuming the lithium compound and subjecting the surface to the fumes which condense and adhere thereto, or by electron beam deposition in a vacuum. Preferably, the coating or film 56 is made quite thin, as for example, a film of monomolecular thickness and upwards to thicknesses of about 0.0005 to 0.01 inch. However, if desired, the coating or film may be in a more massive form. Thus, when the combs, and hence the electrodes, are connected into the electrical circuit 11 of FIG. 1, the lithium compound 56 between the electrodes is connected in series in that circuit for controlling the current flow therethrough in accordance with the temperature-resistance coefficient of the lithium compound.

Because of the plurality of interleaving metallic electrodes and the thin film of lithium compound therebetween a large active surface area is presented to the ambient temperature conditions and the device 50 is therefore rapid in its response to such temperature conditions and operates to control large current flows in the electrical circuit 11 with minimum resistance, it having large current carrying capacities.

If desired, the other side of the insulating sheet 51 may also be provided with a pair of metallic combs 52 and 53 with the tabs 57 and 58 thereof electrically connected to the corresponding tabs on the first side of the insulating sheet 51. Here, also, these latter combs 52 and 53 may be provided with a thin layer or film of the lithium compound as described above. By so utilizing the two assemblies and so connecting them in parallel the current carrying capacity of the device 50 is thereby greatly increased. Here, also, the layers or films 56 of the lithium compound, if desired or necessary, may be encapsulated for protection against air and moisture by applying suitable protective coatings or sheets of air and moisture impervious electrical insulating material thereover, such coatings or sheets being illustrated at 59 and 60 in FIG. 6. Here, again, the device 50 of FIGS. 5 and 6 operates like the devices disclosed above and, accordingly, a further description of the operation of the device 50 is not necessary.

While for purposes of illustration several forms of this invention have been disclosed, other forms thereof may become apparent to those skilled in the art upon reference to this disclosure and, therefore, this invention is to be limited only by the scope of the appended claims.

I claim as my invention:

1. A temperature responsive resistance current controlling device for controlling an electrical circuit in accordance with temperature conditions affecting said device comprising, spaced apart metallic electrodes, a body of at least one lithium compound selected from the group consisting of lithium oxide, lithium hydroxide and lithium carbonate and a self-supporting solid diluent and having a substantial negative temperature-resistance coefficient interposed between and in electrical contact with said electrodes, and means connected to said electrodes for connecting said body in series with the electrical circuit for controlling the current flow therethrough in accordance with the temperature of said body as affected by the temperature conditions to increase the current flow upon an increase in temperature and to decrease the current flow upon a decrease in temperature.

2. A temperature responsive resistance current controlling device for controlling an electrical circuit in accordance with temperature conditions affecting said device comprising, spaced apart metallic electrodes, a solid state composition containing a mixture of a lithium compound consisting essentially of a solid fusion product resulting from essentially fully burning lithium metal in an oxygen containing atmosphere and a self-supporting solid diluent and having a substantial negative temperature-resistance coefficient interposed between and in electrical contact with said electrodes, and means connected to said electrodes for connecting said lithium compound in series with the electrical circuit for controlling the current flow therethrough in accordance with the temperature of said lithium compound as affected by the temperature conditions to increase the current flow upon an increase in temperature and to decrease the current flow upon a decrease in temperature.

3. A temperature responsive resistance current controlling device for controlling an electrical circuit in accordance with temperature conditions of an environment affecting said device, comprising, spaced apart metallic electrodes, a solid state composition containing a mixture of at least one lithium compound and a self-supporting solid diluent and having a substantial negative temperature-resistance coefficient and being interposed between and in electrical contact with the electrodes, said electrodes providing means for connecting said composition in the electrical circuit for controlling the current flow therethrough in accordance with the temperature of said composition as affected by the temperature conditions of the environment to increase the current flow upon an increase in temperature and to decrease the current flow upon a decrease in temperature.

4. A temperature responsive resistance current controlling device for controlling an electrical circuit in accordance with temperature conditions of an environment affecting said device, comprising, spaced apart metallic electrodes, a solid state composition containing a mixture of at least one lithium compound and a self-supporting solid diluent and having a substantial negative temperature-resistance coefficient and being interposed between and in electrical contact with the electrodes, said mixture containing a plurality of lithium compounds of different melting points, said electrodes providing means for connecting said composition in the electrical circuit for controlling the current flow therethrough in accordance with the temperature of said composition as affected by the temperature conditions of the environment to increase the current flow upon an increase in temperature and to decrease the current flow upon a decrease in temperature.

5. A temperature responsive resistance current controlling device for controlling an electrical circuit in accordance with temperature conditions of an environment affecting said device, comprising, spaced apart metallic electrodes, a solid state composition containing a mixture of at least one lithium compound and a self-supporting solid diluent and having a substantial negative temperature-resistance coefficient and being interposed between and in electrical contact with the electrodes, said mixture being selected from the group consisting of lithium oxide, lithium hydroxide and lithium carbonate, said electrodes providing means for connecting said composition in the electrical circuit for controlling the current flow therethrough in accordance with the temperature of said composition as affected by the temperature conditions of the environment to increase the current flow upon an increase in temperature and to decrease the current flow upon a decrease in temperature.

6. A temperature responsive resistance current controlling device for controlling an electrical circuit in accordance with temperature conditions of an environment affecting said device, comprising, spaced apart metallic electrodes, a solid state composition containing a mixture of at least one lithium compound and a self-supporting solid diluent and having a substantial negative temperature-resistance coefficient and being interposed between and in electrical contact with the electrodes, said mixture comprising the solid fusion product resulting from essentially fully burning lithium metal in air, said electrodes providing means for connecting said composition in the electrical circuit for controlling the current flow therethrough in accordance with the temperature of said composition as affected by the temperature conditions of the environment to increase the current flow upon an increase in temperature and to decrease the current flow upon a decrease in temperature.

7. A temperature responsive resistance current controlling device for controlling an electrical circuit in accordance with temperature conditions of an environment affecting said device, comprising, spaced apart metallic electrodes, a solid state composition containing a mixture of at least one lithium compound and a self-supporting solid diluent and having a substantial negative temperature-resistance coefficient and being interposed between and in electrical contact with the electrodes, said at least one lithium compound of said mixture being adapted to be heated to a molten state and said solid diluent of said mixture maintaining said at least one molten lithium compound in place in the mixture, said electrodes providing means for connecting said composition in the electrical circuit for controlling the current flow therethrough in accordance with the temperature of said composition as affected by the temperature conditions of the environment to increase the current flow upon an increase in temperature and to decrease the current flow upon a decrease in temperature.

8. A temperature responsive resistance current controlling device for controlling an electrical circuit in accordance with temperature conditions of an environment affecting said device, comprising, spaced apart metallic electrodes, a solid state composition containing a mixture of at least one lithium compound and a self-supporting solid diluent and having a substantial negative temperature-resistance coefficient and being interposed between and in electrical contact with the electrodes, said solid diluent of said mixture comprising a lithium compound of higher melting point than the melting point of said at least one lithium compound of said mixture, said electrodes providing means for connecting said composition in the electrical circuit for controlling the current flow therethrough in accordance with the temperature of said composition as affected by the temperature conditions of the environment to increase the current flow upon an increase in temperature and to decrease the current flow upon a decrease in temperature.

9. A temperature responsive resistance current controlling device for controlling an electrical circuit in accordance with temperature conditions of an environment affecting said device, comprising, spaced apart metallic electrodes, a solid state composition containing a mixture of at least one lithium compound and a self-supporting solid diluent and having a substantial negative temperature-resistance coefficient and being interposed between and in electrical contact with the electrodes, said at least one lithium compound of said mixture comprising a eutectic mixture having at least one lithium compound, said electrodes providing means for connecting said composition in the electrical circuit for controlling the current flow therethrough in accordance with the temperature of said composition as affected by the temperature conditions of the environment to increase the current flow upon an increase in temperature and to decrease the current flow upon a decrease in temperature.

10. A temperature responsive resistance current controlling device for controlling an electrical circuit in accordance with temperature conditions of an environment affecting said device, comprising, spaced apart metallic electrodes, a solid state composition containing a mixture of at least one lithium compound and a self-supporting solid diluent and having a substantial negative temperature-resistance coefficient and being interposed between and in electrical contact with the electrodes, said at least one lithium compound of said mixture comprising a eutectic mixture of a plurality of lithium compounds, said electrodes providing means for connecting said composition in the electrical circuit for controlling the current flow therethrough in accordance with the temperature of said composition as affected by the temperature conditions of the environment to increase the current flow upon an increase in temperature and to decrease the current flow upon a decrease in temperature.

11. A temperature responsive resistance current controlling device for controlling an electrical circuit in accordance with temperature conditions of an environment affecting said device, comprising, spaced apart metallic electrodes, a solid state composition containing a mixture of at least one lithium compound and a self-supporting solid diluent and having a substantial negative temperature-resistance coefficient and being interposed between and in electrical contact with the electrodes, said mixture comprising a eutectic mixture of lithium compounds of different melting points with the lithium compound of higher melting point in excess of the amount required for the eutectic mixture and forming the solid diluent of the mixture for maintaining the eutectic mixture when molten in place in the mixture, said electrodes providing means for connecting said composition in the electrical circuit for controlling the current flow therethrough in accordance with the temperature of said composition as affected by the temperature conditions of the environment to increase the current flow upon an increase in temperature and to decrease the current flow upon a decrease in temperature.

12. A temperature responsive resistance current controlling device for controlling an A.C. electrical circuit in accordance with the temperature conditions of an environment affecting said device, comprising, spaced apart metallic electrodes, a solid state composition containing a mixture of at least one lithium compound and a self supporting solid diluent and having a substantial negative temperature-resistance coefficient and being interposed between and in electrical contact with the electrodes, said electrodes providing means for connecting said composition in the A.C. electrical circuit for controlling the current flow therethrough in accordance with the temperature of said composition as affected by the temperature conditions of the environment to increase the current flow upon an increase in temperature and to decrease the current flow upon a decrease in temperature.

13. A temperature responsive resistance current controlling device for controlling an electrical circuit in accordance with temperature conditions of an environment affecting said device, comprising, a pair of parallel spaced apart sheet electrodes, a solid state composition containing a mixture of at least one lithium compound and a self-supporting solid diluent and having a substantial negative temperature-resistance coefficient and being interposed between and in electrical contact with the electrodes, said electrodes providing means for connecting said composition in the electrical circuit for controlling the current flow therethrough in accordance with the temperature of said composition as affected by the temperature conditions of the environment to increase the current flow upon an increase in temperature and to decrease the current flow upon a decrease in temperature.

14. A temperature responsive resistance current controlling device for controlling an electrical circuit in accordance with temperature conditions of an environment affecting said device comprising, an elongated inner metallic electrode and an elongated outer tubular metallic electrode concentrically arranged in spaced apart relation about the inner electrode, a solid state composition containing a mixture of at least one lithium compound and a self-supporting solid diluent and having a substantial negative temperature-resistance coefficient and being interposed between and in electrical contact with the electrodes, said electrodes providing means for connecting said composition in the electrical circuit for controlling the current flow therethrough in accordance with the temperature of said composition as affected by the temperature conditions of the environment to increase the current flow upon an increase in temperature and to decrease the current flow upon a decrease in temperature.

15. A temperature responsive resistance current controlling device for controlling an electrical circuit in accordance with temperature conditions of an environment affecting said device, comprising, a pair of spaced apart wire-like metallic electrodes, a solid state composition bead containing a mixture of at least one lithium compound and a self-supporting solid diluent and having a substantial negative temperature-resistance coefficient and encompassing said electrodes and in electrical contact with said electrodes, said electrodes providing means for connecting said composition in the electrical circuit for controlling the current flow therethrough in accordance with the temperature of said composition as affected by the temperature conditions of the environment to increase the current flow upon an increase in temperature and to decrease the current flow upon a decrease in temperature.

16. A temperature responsive resistance current controlling device for controlling an electrical circuit in accordance with temperature conditions of an environment affecting said device, comprising, an electrical insulating sheet, a pair of metallic combs applied to said sheet and having a plurality of spaced apart interleaving teeth forming a plurality of spaced apart electrodes, a layer of a solid state composition containing a mixture of at least one lithium compound and a self-supporting solid diluent and having a substantial negative temperature-resistance coefficient and applied to said sheet in electrical contact with said electrodes, said electrodes providing means for connecting said composition in the electrical circuit for controlling the current flow therethrough in accordance with the temperature of said composition as affected by the temperature conditions of the environment to increase the current flow upon an increase in temperature and to decrease the current flow upon a decrease in temperature.

17. A temperature responsive resistance current controlling device for controlling an electrical circuit in accordance with temperature conditions of an environment affecting said device, comprising, an electrical insulating sheet, a pair of metallic combs applied to each side of said sheet and having a plurality of spaced apart interleaving teeth forming a plurality of spaced apart electrodes on each side of said sheet, means connected to said combs and hence to said electrodes for electrically connecting said electrodes in parallel, a layer of a solid state composition containing a mixture of at least one lithium compound and a self-supporting solid diluent and having a substantial negative temperature-resistance coefficient and applied to each side of said sheet in electrical contact with said electrodes, said electrodes providing means for connecting said composition in the electrical circuit for controlling the current flow therethrough in accordance with the temperature of said composition as affected by the temperature conditions of the environment to increase the current flow upon an increase in temperature and to decrease the current flow upon a decrease in temperature.

18. A temperature responsive resistance current controlling device for controlling an electrical circuit in accordance with temperature conditions of an environment affecting said device, comprising, spaced apart metallic electrodes, a solid state composition containing a mixture of at least one lithium compound and a self-supporting solid diluent and having a substantial negative temperature-resistance coefficient and being interposed between and in electrical contact with the electrodes, said electrodes providing means for connecting said composition in the electrical circuit for controlling the current flow therethrough in accordance with the temperature of said composition as affected by the temperature conditions of the environment to increase the current flow upon an increase in temperature and to decrease the current flow upon a decrease in temperature, and means for encapsulating said solid state composition to protect the same from the effects of moisture and air.

References Cited by the Examiner

UNITED STATES PATENTS

| | | | |
|---|---|---|---|
| 2,627,570 | 2/53 | Hall | 338—30 |
| 2,842,648 | 7/58 | Reynolds | 338—26 |
| 3,064,222 | 11/62 | Renier | 338—25 |

RICHARD M. WOOD, *Primary Examiner.*